J. King,
Steam-Engine Valve-Gear.
Nº 26,908.                    Patented Jan. 24, 1860.
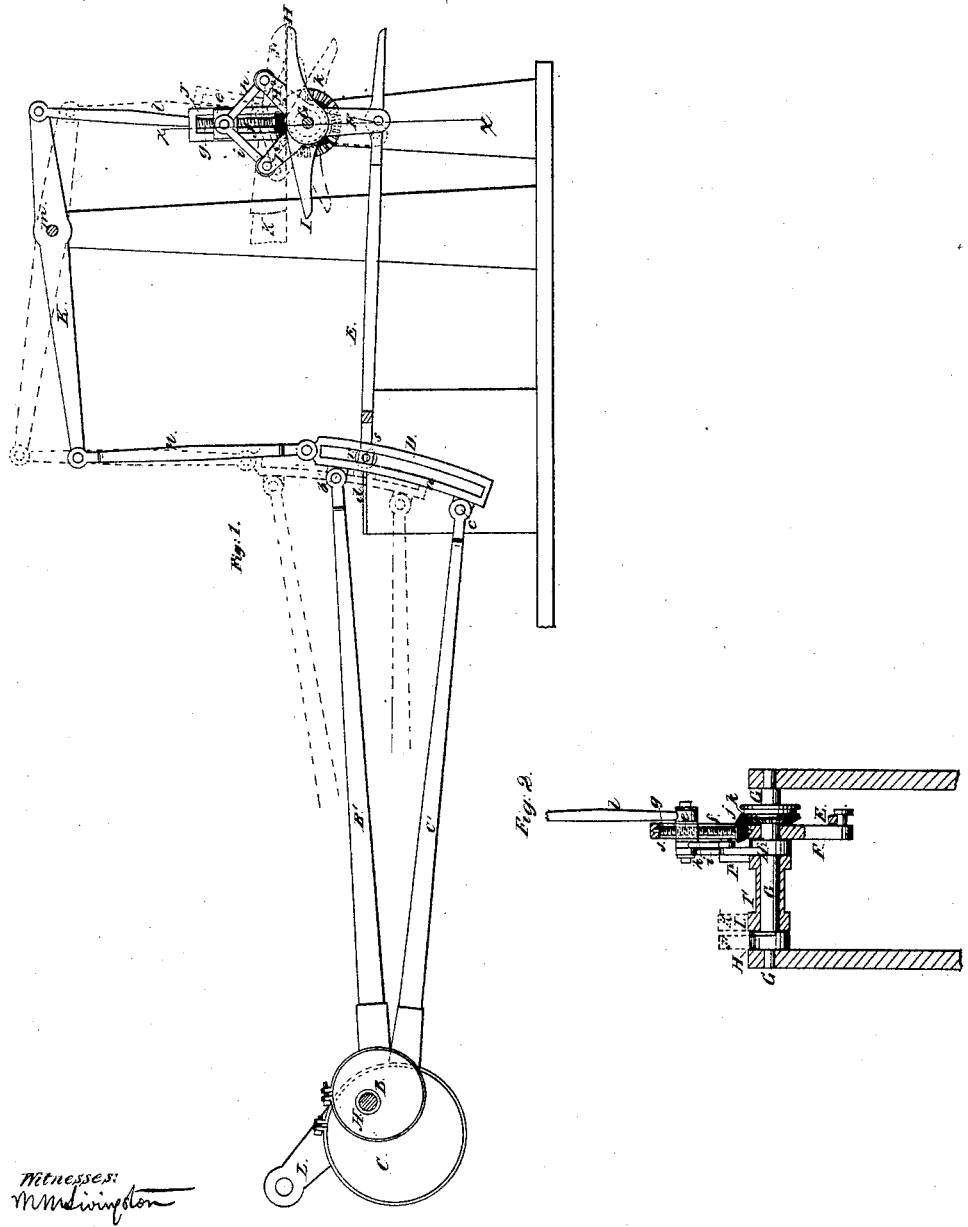
Witnesses:
M. M. Livingston
Mich. Hughes.
Inventor.
Julius King

UNITED STATES PATENT OFFICE.

JULIUS KING, OF HOBOKEN, NEW JERSEY.

VALVE-GEAR FOR STEAM-ENGINES.

Specification of Letters Patent No. 26,908, dated January 24, 1860.

*To all whom it may concern:*

Be it known that I, JULIUS KING, of Hoboken, in the county of Hudson and State of New Jersey, have invented a new and useful Improvement in the Valve-Gear of Steam-Engines; and I do hereby declare that the following is a full, clear, and exact description of the same, reference being had to the accompanying drawings, forming part of this specification, in which—

Figure 1, is a side view of a valve gear for a puppet valve engine constructed according to my invention. Fig. 2 is a vertical section of the same taken transversely to Fig. 1, in the plane indicated by the line $x, x$, in that figure.

Similar letters of reference indicate corresponding parts in both figures.

My invention consists principally in the combination with two movable toes on the valve rockshaft of a steam engine, of two eccentrics arranged at right angles to each other or thereabout on the crank shaft or other rotating shaft of the engine, and connected by a movable yoke with the rock-shaft in a manner substantially as hereinafter described for the purpose of enabling steam to be cut off from the cylinder by the main valves at any point of the stroke that may be at any time desirable.

To enable others skilled in the art to make and use my invention, I will proceed to describe its construction and operation.

A, is the crank shaft of the engine and B, C, are the two eccentrics, both fast on the said shaft. The eccentric B, is only so far out of line with the crank L, as is required to give a "lead" to the valves, and the eccentric C, which has a much greater throw is at a right angle to that of B. The connecting rods B' and C', of the eccentrics B, C, are connected by pin joints $b$, $c$, with opposite ends of a yoke D, which contains an arc formed slot $a$, within which is fitted a block $r$, which is bored out to receive the connecting pin $s$, of a rod E, which connects with an arm F that is loose on the valve rock-shaft G. The said pin $s$ has its ends fitted to two straight guides $d$, which guide it in the motion it derives from the two eccentrics for the purpose of operating the rock-shaft.

H and I, are the two toes with which the rock-shaft G is fitted for the purpose of operating on the two lifters J,' K', which are shown in dotted outline in Figs. 1 and 2 attached to the lifting rods of the induction valves of the engine. Separate mechanism is to be used for operating the eduction valves, but no part of such mechanism is represented in the drawing, as it may be of any well known or suitable character. The toe H, is keyed on the rock-shaft G, and the toe I is secured rigidly to a sleeve I' that is fitted to turn on the rock-shaft. The rock-shaft has rigidly attached to it an arm $H^2$, and the sleeve I' has rigidly attached to it, an arm $I^2$ and these arms are connected by two links $h$, and $i$, with a nut $e$, that is fitted into a slotted arm J, which may be made in the same piece with the arm F, or otherwise rigidly secured to the said arm, the said nut receiving a screw $f$, which is fitted to the ends of the slot in the arm J, in such a manner as to be capable of turning freely within, but not moving longitudinally to the said arm, whose slot $g$, is radial to the rock-shaft. By turning the screw $f$, the nut is caused to move in the slot $g$ toward or from the shaft, and so by its action on the links $h$, and $i$, and arms $H^2$, $I^2$ to turn the toes H, I, simultaneously in opposite directions, in the manner illustrated in Fig. 1, where the nut is represented in two positions in black and red outline, and the toes in positions to correspond with the two positions of the nut. In effecting this adjustment, the rock-shaft turns with the toe H and the sleeve I', with the toe I, and when the toes are adjusted, they, as well as the arms F, and J, are as rigidly connected with the rock-shaft as though all were keyed on. For convenience of turning the nut, it is furnished with a bevel gear $j$ which gears with a loose bevel gear $k$ attached to a hand wheel that is fitted to turn on the rock-shaft. The nut $e$ is connected by a rod $l$, with one end of a lever K which works on a fixed fulcrum $m$, and whose opposite end is connected by a rod $n$, with the slotted yoke D in such a manner that as the nut $e$, is moved toward the rock-shaft to move the toes toward each other, the said rod $l$, lever K, and rod $n$, are made to move the yoke upon the block $r$ to bring that end which is attached to the larger eccentric nearer to the connecting pin $s$, of the rod E, and that as the nut is moved in the opposite direction to move the toes farther apart, the yoke is moved in a direction to bring its other end nearer to the connecting pin S.

The length of the screw $f$ should be sufficient to permit a sufficient movement of the yoke on the block to allow either eccentric rod to come opposite the connecting pin S so that either one alone may be made to act upon the valve rock-shaft as though it were directly connected with the arm F, of the rock-shaft, and the other eccentric may be totally inoperative.

When the yoke is in such a position that the rod B' of the smaller eccentric is opposite the connecting pin S, of the rod E, and the larger eccentric is inoperative upon the valve rock-shaft, the position of the toes relatively to each other is such that one toe lets its respective valve close at the instant the other toe commences to open its respective valve, one or other of the toes being always in operation; each one commencing to rise and open the valve at, or just before the commencement of the stroke of the piston in one direction, and continuing to do so during the first half of the stroke, and descending and allowing the valve to close gradually during the remaining half of the stroke. But when the yoke is raised high enough to bring eccentric rod C', opposite to the connecting pin S, and the smaller eccentric rod is inoperative upon the valve rockshaft, the position of the toes relatively to each other is such that they do not come into operation to open the valves at all or any more than is due to the lead given to the eccentric, each toe commencing to rise when the piston is at about half stroke and rising during the remaining half, but not rising high enough or only rising just high enough to operate in the slightest degree upon the lifter. Now by adjusting the yoke between the above specified positions to bring the connecting pin S, at different distances from the two eccentric rods, it is obvious that the steam may be cut off at any point in the stroke of the piston that may be desired, and as both eccentrics bring the toes to a position to commence opening the valve at the commencement of the stroke of the piston, steam must be admitted at the proper time whatever may be the position of the eccentric yoke D.

I do not claim giving the rock-shaft a movement without effect, as that constitutes part of the subject matter of Letters Patent of R. L. and F. B. Stevens dated January 25th 1841, but

What I claim as my invention, and desire to secure by Letters Patent is—

1. The combination with the movable toes H, I, attached as set forth to the valve rock-shaft, and sleeve of two eccentrics B, C, arranged at right angles to each other or thereabouts, on the crank shaft or its equivalent, and having their rods connected with the rock-shaft by means of a movable yoke D, rod E, and arm F, and controlled by a guide block $r$, and guide $d$, or their equivalents, the whole operating substantially as herein described for the purpose specified.

2. And I also claim combining the eccentric yoke D, with the movable toes H, I, by means of the arms $H^2$, $I^2$, links $h$ $i$, nut $e$, screw $f$, rods $l$, $n$, and lever K, the whole applied and operating as set forth to preserve a proper relation between the eccentric yoke and the toes.

JULIUS KING.

Witnesses:
M. M. LIVINGSTON,
MICH. HUGHES.